United States Patent
Ley et al.

(10) Patent No.: US 8,965,716 B2
(45) Date of Patent: Feb. 24, 2015

(54) METHOD AND APPARATUS FOR TESTING AT LEAST ONE TEMPERATURE SENSOR IN A VEHICLE

(75) Inventors: Andre Ley, Ferndale, MI (US); Benjamin D. Sweet, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 615 days.

(21) Appl. No.: 13/018,588

(22) Filed: Feb. 1, 2011

(65) Prior Publication Data

US 2011/0246105 A1  Oct. 6, 2011

Related U.S. Application Data

(60) Provisional application No. 61/320,938, filed on Apr. 5, 2010.

(51) Int. Cl.
*G01R 21/00* (2006.01)
*G01K 15/00* (2006.01)

(52) U.S. Cl.
CPC ............ *G01K 15/00* (2013.01); *G01K 15/007* (2013.01)
USPC ........................................................ 702/60

(58) Field of Classification Search
USPC ................ 702/60, 63, 65, 108, 116, 130, 183
See application file for complete search history.

(56) References Cited

U.S. PATENT DOCUMENTS

| | | | |
|---|---|---|---|
| 4,788,398 A | 11/1988 | Hornung | |
| 5,153,835 A | 10/1992 | Hashimoto et al. | |
| 5,617,337 A | 4/1997 | Eidler et al. | |
| 5,880,361 A | 3/1999 | Taniguchi | |
| 6,200,021 B1 | 3/2001 | Mitsutani et al. | |
| 6,208,917 B1 | 3/2001 | McKissick, Jr. et al. | |
| 7,120,535 B2 | 10/2006 | Rahman et al. | |
| 7,445,383 B2 | 11/2008 | Huttenlocher et al. | |
| 7,470,059 B2 | 12/2008 | Yoshida et al. | |
| 2005/0275383 A1* | 12/2005 | Ishishita | ........................ 320/150 |
| 2008/0202831 A1* | 8/2008 | Gouker | ........................ 180/65.3 |
| 2010/0071451 A1* | 3/2010 | Matsunaga et al. | ........ 73/114.71 |

FOREIGN PATENT DOCUMENTS

| | | |
|---|---|---|
| CN | 1713447 A | 12/2005 |
| DE | 10221992 C1 | 11/2003 |
| WO | 2009148710 A1 | 12/2009 |

OTHER PUBLICATIONS

Chinese Office Action for corresponding Chinese Application No. 201110083939.5, mailed Jan. 29, 2013, 8 pages.
Chinese Office Action for corresponding Application No. 201110083939.5, mailed Apr. 28, 2014, 9 pages.
German Office Action for corresponding Application No. 10 2011 005 991.1, mailed Nov. 21, 2014, 10 pages.

* cited by examiner

*Primary Examiner* — Mohamed Charioui
(74) *Attorney, Agent, or Firm* — Brooks Kushman P.C.

(57) ABSTRACT

An apparatus and method for testing a temperature sensor in a vehicle is provided. The apparatus includes a power device. The power device is configured to receive a power signal and to filter the power signal to generate a filtered power signal. The power device is further configured to compare the filtered power signal to a first threshold and to test the temperature sensor based on the comparison of the filtered power signal to the first threshold.

20 Claims, 2 Drawing Sheets

METHOD AND APPARATUS FOR TESTING AT LEAST ONE TEMPERATURE SENSOR IN A VEHICLE

CROSS-REFERENCE TO RELATED APPLICATIONS

This application claims the benefit of U.S. provisional application Ser. No. 61/320,938 filed on Apr. 5, 2010, which is hereby incorporated by reference in its entirety.

TECHNICAL FIELD

Embodiments of the present invention generally relate to a method and apparatus for testing at least one temperature sensor in a vehicle.

BACKGROUND

One or more temperature sensors within a vehicle may need to be tested to ensure that the temperature sensor is operating properly. While testing the temperature sensor, it may be necessary to determine whether the temperature sensor is "stuck in range" which generally means that a failed temperature sensor appears to be outputting a value that is in an acceptable range but does not change. Depending on the vehicle application, the temperature sensor, while under normal operation, may not exhibit a drastic change in temperature over time and may generate readings which appear to be in a steady state condition. These conditions may make it difficult to predict a temperature change and to test the temperature sensor because of the steady state condition that the sensor is in. A stuck temperature sensor may result in temperature values remaining unchanged and therefore not report a failure.

SUMMARY

In one embodiment, an apparatus for testing a temperature sensor in a vehicle is provided. The apparatus includes a power device. The power device is configured to receive a power signal and to filter the power signal to generate a filtered power signal. The power device is further configured to compare the filtered power signal to a first threshold and to test the temperature sensor based on the comparison of the filtered power signal to the first threshold.

In another embodiment, a method for testing a temperature sensor in a vehicle is provided. The method includes receiving a power signal and filtering the power signal to generate a filtered power signal. The method further includes comparing the filtered power signal to a first threshold and testing the temperature sensor based on the comparison of the filtered power signal to the first threshold.

In yet another embodiment, an apparatus for testing a temperature sensor in a vehicle is provided. The apparatus includes a battery charger. The battery charger is configured to receive a power signal from a charge station and to filter the power signal to generate a filtered power signal. The battery charger is further configured to compare the filtered power signal to a first threshold and to test the temperature sensor based on the comparison of the filtered power signal to the first threshold.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments set forth herein test one or more temperature sensors in a power device. The power device is generally configured to transform electrical energy and as a result, electronics within the device may generate heat. The one or more temperature sensors may be positioned about various locations within the power device to provide temperature readings. The temperature readings provide feedback to one or more controllers within the power device to ensure that such electronics operate in acceptable temperature ranges. It is recognized that a correlation can be established between the power flowing through the device and temperature at one or more locations within the power device. When a predetermined power threshold has been exceeded, such a condition may result in a temperature change which can then be detected. By testing the one or more temperature sensors when a change in temperature is expected, the operational integrity of the one or more temperature sensors can be determined. It is recognized that the power device may include various electrical devices that may include, but not limited to, any number of microprocessors, ICs, memory devices (e.g., FLASH, RAM, ROM, EPROM, EEPROM, or other suitable variants thereof), and software which co-act, with the electronic devices to perform the various functions set forth below.

Figure 1:
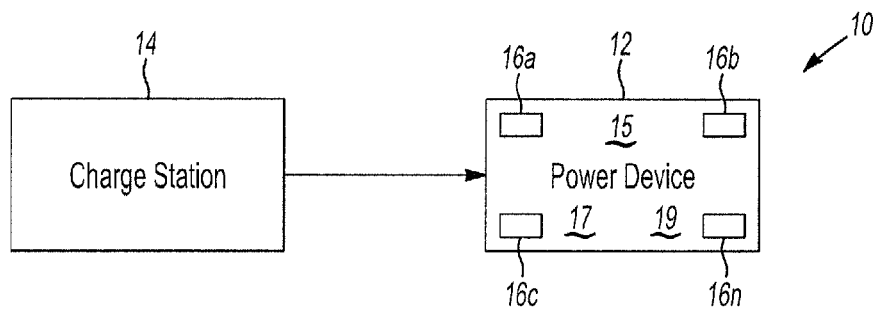
FIG. 1 depicts a power system in accordance to one embodiment of the present invention.

FIG. 1 depicts a power system 10 in accordance to one embodiment of the present invention. In one example, the power system 10 may be implemented in connection with a battery charging apparatus in a hybrid, electrical plug in hybrid, or electric vehicle. The system 10 may include a power device 12 and a charge station 14. The power device 12 may be, but not limited to, a battery charger. The battery charger may be operably coupled to the charge station 14 for receiving AC power therefrom. The battery charger may rectify the AC energy into DC energy and control the transfer of such energy to one or more batteries (not shown) in the vehicle for power storage.

The power device 12 may include any number of electronics 15 that generate heat while rectifying AC energy into DC energy. It is known to implement various mechanisms in an attempt to remove heat or to maintain acceptable operating temperatures for the electronics 15. Hence, the need to understand various temperature readings for the mechanisms used to maintain acceptable temperatures for the electronics 15 in the power device 12 may be necessary. The power device 12 may include any number of temperature sensors (or thermistors) 16a-16n ("16") to provide the temperature readings. It is recognized that other suitable variations can be used in place of the temperature sensors/thermistors and that such devices are capable of being tested in accordance to the embodiments as set forth hereafter.

The power device 12 may include any number of cooling devices included therein for cooling various components while rectifying AC energy into DC energy. In one example, the power device 12 may include a cold plate 17 defining one or more channels 19 for enabling fluid transfer therethrough. The coolant serves to maintain an acceptable temperature for the electronics 15 within the device 12. At least one of the temperature sensors 16 may be positioned about the cold plate 17 and/or the channels 19 for providing temperatures readings thereof. In addition, at least one of the temperature sensors 16 may be positioned on a circuit board within the power device 12 proximate to electronics 15 that are known to generate heat.

One or more of the temperature sensors 16 may need to be tested to ensure proper operation in order to support on-board diagnostic (OBD) requirements. OBD requirements generally require that an apparatus provide electronic status for various devices in the vehicle for troubleshooting and repair. Such status may relate to, but not limited to, operational states of the device that may be used as an indicator to determine if the device is functioning properly.

Figure 2:
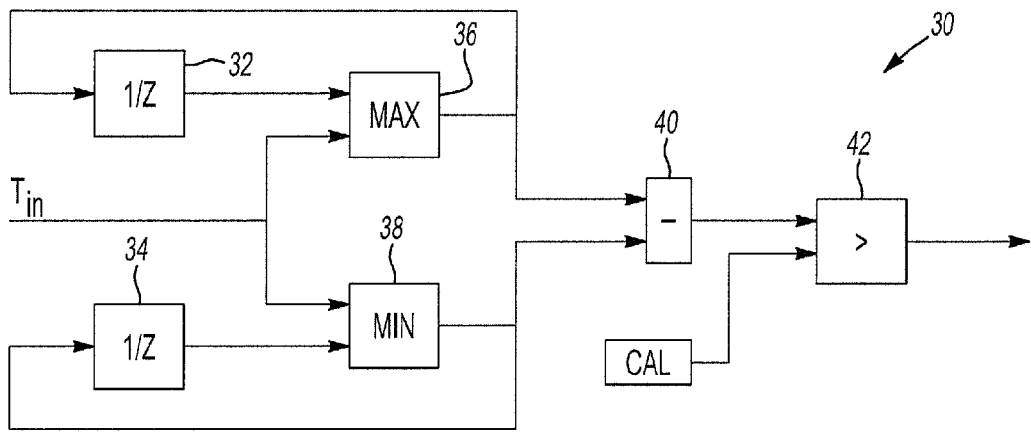
FIG. 2 depicts a conventional apparatus for performing a classical stuck sensor test in a vehicle.

FIG. 2 depicts a conventional apparatus 30 for performing a classical stuck sensor test in the vehicle. The classical stuck sensor test may be performed on a temperature sensor or pressure sensor. In one example, the apparatus 30 may be used to support OBD requirements. The apparatus 30 includes a first delay 32, a second delay 34, a first comparator 36, a second comparator 38, an adder 40, and a comparator 42. In operation, the first comparator 36 compares the most recent temperature reading against a previously recorded temperature reading and selects the maximum temperature reading therefrom. In a similar manner, the second comparator 38 compares the most recent temperature reading against a previously recorded temperature reading and selects the minimum temperature reading therefrom.

The first and second delays 32, 34 delay the selected max and min temperature readings, respectively for comparison to a temperature reading that will occur in the future. The first comparator 36 and the second comparator 38 output the selected maximum and minimum temperature readings, respectively, to the adder 40. The adder 40 subtracts the selected maximum temperature reading from the selected minimum temperature reading. An output of the adder 40 is compared to a calibrated value. The output of the adder 40 is compared to the calibrated value to determine if the range [Max-Min] of the monitored temperature readings exceeds the calibrated value. If the output of the adder 40 is greater than the calibrated value, then the apparatus 30 may provide an indication that the sensor is working properly (i.e., the sensor is not stuck). While the apparatus may be acceptable for determining whether the sensor operates properly, the apparatus 30 may not be suitable for systems that are likely to operate at steady-state conditions. In particular, the apparatus 30 may not be able to determine that the temperature or pressure readings remain unchanged and output values that are generally in an acceptable range. As such, the apparatus 30 may report false failure under steady state conditions.

In addition, it may take for a long period of time for a device to experience a temperature change. For example, when the coolant system is operating (e.g., system that employs cold plate 17, channels 19 and fluid (i.e., coolant) as noted above in connection with FIG. 1), the power device 12 may experience a power change from 0 W to 1000 W which may create a temperature change of 1.5 C. Thus, with a power change of 600 W, it may take 5 minutes or longer until the temperature shows a temperature change at all.

The embodiments set forth herein recognize that a correlation can be established between power flowing through the system 10 and temperature at one or more locations within device 12. In addition, when a certain power threshold has been exceeded, such a condition may result in a temperature change which can then detected. By testing the temperature sensor 16 when a change in temperature is expected to occur, the operational integrity of the temperature sensor 16 can then be ascertained.

Figure 3:
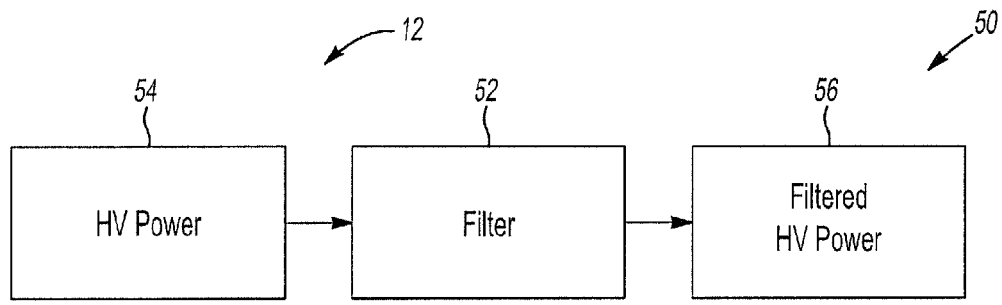
FIG. 3 depicts a block diagram for use in the power system of FIG. 1 in accordance to one embodiment of the present invention.

FIG. 3 depicts a block diagram 50 for use in the power system 10 of FIG. 1 in accordance with one embodiment of the present invention. The power device 12 may include a filter 52 (e.g., a low pass filter or other suitable device). The filter 52 receives high voltage (HV) power (e.g., measured HV power) 54 to generate a filtered HV power 56. The voltage may be 400V or greater and the HV power 54 may correspond up to 2 KW or greater. The filter 52 may simulate a slow reaction of temperature with respect to the HV power 54. The power device 12 (if implemented as a battery charger) may receive the HV power from the charge station 14 and pass the HV power through the filter 52 to generate the filtered HV power 56. The filter 52 may include a time constant $\alpha$ that may be adequate for modeling a correlation between power and temperature. In addition, the filter 52 may reflect an overall history of power changes. In general, the filter 52 naturally reflects the history of its input values. Each new value may change the current value by a small amount. If values are low for a long time, the filtered value may be low. A high input value may increase the filtered value by a small amount because the values before (historical values) were low. The time constant used for the filter 52 should be selected such that fast fluctuations in power may not influence the actual temperature.

Figure 4:
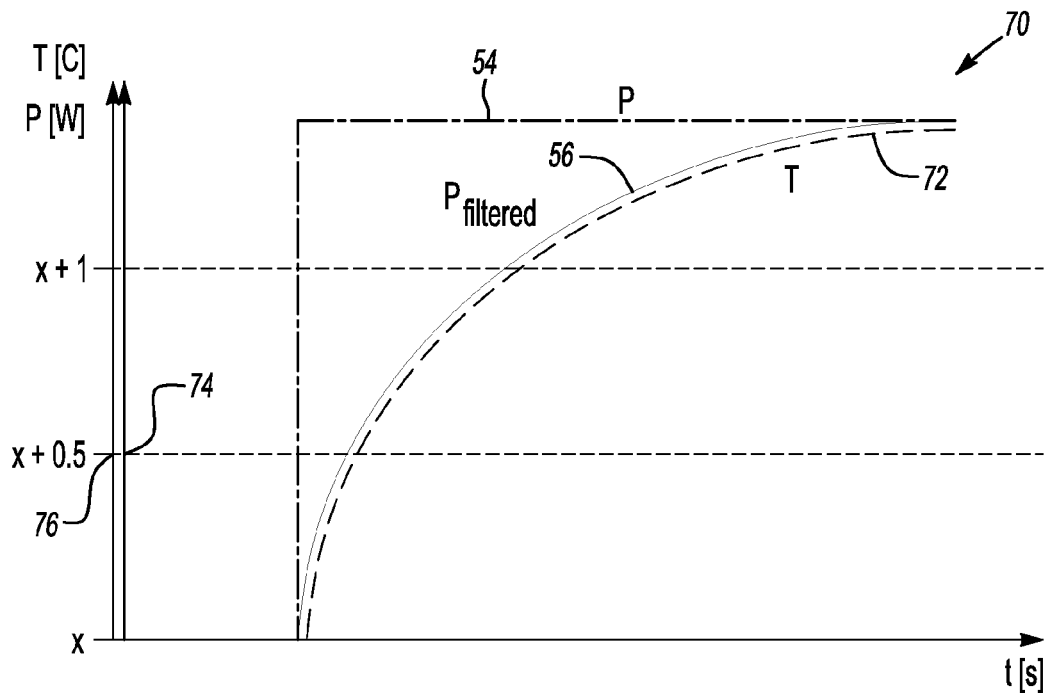
FIG. 4 depicts a plot indicating a correlation between power and temperature in accordance to one embodiment of the present invention.

FIG. 4 depicts a plot 70 indicating a correlation between power and temperature that may be utilized by the power device 12 to test the temperature sensor 16 in accordance to one embodiment of the present invention. While the power device 12 measures power, it is recognized that the temperature sensed by the at least one temperature sensor 16 may increase. In general, the power device 12 may monitor the HV power 54, the filtered power 56, and temperature 72 from one or more of the temperature sensors 16. As long as the measured power 54 is above the filtered power 56, the temperature 72 is expected to increase. The plot 70 depicts that the temperature 72 rises as the filtered power 56 increases.

The power device 12 monitors the filtered power 56 to determine whether the filtered power 56 has exceeded a filtered power threshold 74 (e.g., x+0.5 W as indicated in FIG. 4). If the power device 12 determines that the filtered power 56 has exceeded the filtered power threshold 74, such a condition may serve as a trigger such that the power device 12 initiates testing the temperature sensor 16. The power device 12 may be configured to monitor for the filtered power 56 on demand via a diagnostic tool and/or may be configured to automatically monitor the filtered power 56 and to automatically determine whether such power has exceeded the filtered power threshold 74 when the power device 12 is engaged in its normal operation.

By exceeding the filtered power threshold 74 with the filtered power 56, the power device 12 determines whether the temperature 72 is increasing. The rationale behind the filtered power 56 exceeding the filtered power threshold 74 is that in some vehicle applications a large amount of power 56 may be needed for one or more areas within the power system 10 to exhibit an overall increase in temperature. By monitoring the filtered power 56 with respect to the filtered power threshold 74, such a condition may be indicative of a sufficient amount of power that is being drawn into the system 10 to warrant a temperature change. In response to the power device 12 determining that the filtered power 56 has exceeded the filtered power threshold 74, the power device 12 may initiate testing the temperature sensor 16 to determine if the temperature 72 has increased above a temperature threshold 76 (e.g., x+0.5° C.) (this operation may occur simultaneously (i.e., monitor for temperature increase at the same time power exceeds threshold 74)).

If the measured temperature 72 has increased with respect to the temperature threshold 76 once the filtered power 56 exceeds the filtered power threshold 74, then the power device 12 may determine that the temperature sensor 16 is operational (e.g., has passed the sensor test). If the measured temperature 72 has not increased after the filtered power 56 exceeds the filtered power threshold 74, the power device 12 may determine that the temperature sensor is "stuck" and is therefore not operating properly. The particular time constant selected in connection with the filter 52 may be to ensure that there is enough energy inserted into the power device 12 to ensure that a temperature change is exhibited.

It is recognized that the power device 12 may be configured to test one or more of the temperatures sensors 16 and in doing so, may be capable of utilizing any number of filters and corresponding time constants (e.g., whether similar to one or another or not) for establishing various filtered power 56 waveforms with each corresponding to a particular temperature sensor 16 that is to be tested. The filtered power threshold 74 is a value that may change dynamically while the power device 12 operates.

The following example demonstrates the manner in which the filtered power threshold 74 may change dynamically based on the operation of the power device 12 and the manner in which the temperature sensor 16 test is triggered. In general, there may be two conditions for the system 10 to display a change in temperature. The power may change for a calibratable minimum and the change has to be present for a minimum amount of time. The time is generally established by the time constant of the filter 52. In the event the power device 12 is "OFF", such a condition may indicate that the HV power 54 is equal to 0 W and a minimum change of the filtered power 56 may be 500 W. The minimum change of the filtered power 56 may correspond to the amount of time that is needed for the temperature sensor to recognize a difference. Assume that the power device 12 is "ON", in this case the HV power 54 may change from 0 to 1000 W. Once the filtered power 56 reaches a threshold of 500 W, then the power device 12 may test the temperature sensor 16.

When the threshold of 500 W (as noted directly above) has been reached and the filtered power 56 is still increasing (e.g., because the actual power is higher), then the minimum power may be added right away. This means that as long as the filtered power 56 increases, the next threshold is set to 1000 W regardless. As such, the temperature sensor 16 may be tested when the filtered power 56 is at 1000 W. However, in the event the power device 12 is turned "OFF" and the filtered power 56 decreases (e.g., starting at 800 W when power is turned off), then the new threshold is set to 800 W−500 W=300 W. Once the filtered power 56 is detected to fall under 300 W, then the power device 12 may test the temperature sensor 16.

Figure 5:
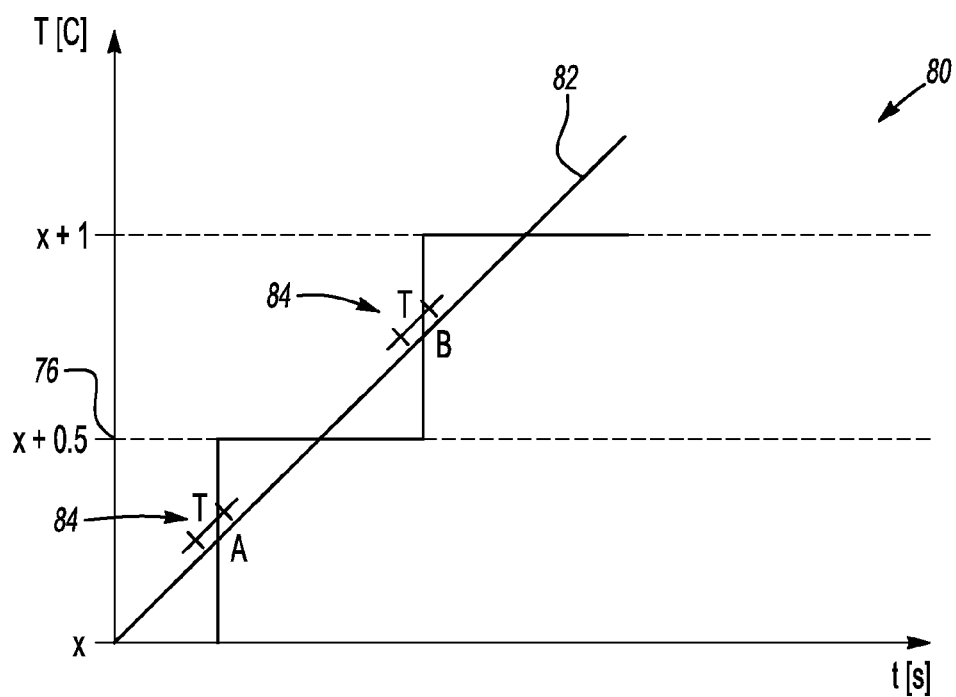
FIG. 5 depicts a plot indicating a correlation between actual and measured temperature in accordance to one embodiment of the present invention.

FIG. 5 depicts a plot 80 indicating a correlation between actual temperature 82 and measured temperature 84. Plot 80 demonstrates how the time constant α as used in connection with the filter 52 can be ascertained. To determine α, the time for a certain temperature increase should be determined. With the example illustrated in plot 80, the time for a 0.5° C. temperature difference may be measured. The 0.5° C. temperature is used as a value to measure against in order to determine the time constant since the 0.5° C. temperature difference may be the smallest step that can be measured with a given measurement device. In short, the 0.5° C. temperature difference generally corresponds to the resolution for reading out the temperature. It is contemplated that a temperature difference other than 0.5° C. may be used. In some applications, the power device 12 may experience an overall change of temperature of not more than 1.5° C. As such, only three temperature readings may be capable of being ascertained if the resolution is 0.5° C.

Consider the following example. Assume that the measured temperature fluctuates between 20° C. and 20.5° C. for a few seconds when the actual temperature is 20.25° C. (e.g., assume that this point corresponds to point A on plot 80). In this case, the power device 12 determines that measured temperature is below the threshold 76. If the actual temperature is 20.75° C., then the measured temperature fluctuates between 20.5° C. and 21° C. In this case, the power device 12 determines that measured temperature is above the threshold 76. Such a condition may be read out by an analog-digital (A/D) readout in the power device 12 and be indicative of an increase in temperature. In general, by using a time constant α corresponding to an interval of 0.5° C., fluctuations in temperature can be determined which may reduce the potential for A/D sampling errors or statistical variations.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for testing a temperature sensor in a vehicle, the apparatus comprising:
   a power device including a filter and being configured to:
   receive a power signal;
   generate a filtered power signal by filtering the power signal with the filter;
   compare the filtered power signal to a first threshold prior to testing the temperature sensor; and
   initiate testing the temperature sensor in response to the filtered power signal being greater than the first threshold.

2. The apparatus of claim 1 wherein the filtered power signal is associated with a measured temperature signal.

3. The apparatus of claim 2 wherein the measured temperature signal corresponds to a temperature reading of a mechanism positioned within the power device.

4. The apparatus of claim 2 wherein the power device is further configured to test the temperature sensor by comparing the measured temperature signal to a temperature threshold.

5. The apparatus of claim 4 wherein the power device is further configured to determine that the temperature sensor is operational in response to the measured temperature signal being greater than the temperature threshold.

6. The apparatus of claim 4 wherein the power device is further configured to determine that the temperature sensor is non-operational in response to the measured temperature signal being below the temperature threshold.

7. The apparatus of claim 1 wherein the filter is configured to filter the power signal using a time constant $\alpha$, the time constant $\alpha$ corresponding to an amount of time that is needed for a predetermined temperature level to be achieved.

8. The apparatus of claim 7 wherein the predetermined temperature level corresponds to 0.5° C.

9. The apparatus of claim 1 wherein the power device is a battery charger.

10. A method for testing a temperature sensor in a vehicle, the method comprising:
   receiving a power signal at a power device;
   filtering the power signal with a filter, to generate a filtered power signal;
   comparing the filtered power signal to a first threshold prior to testing the temperature sensor; and
   trigger testing the temperature sensor in response to the filtered power signal being greater than the first threshold.

11. The method of claim 10 wherein the filtered power signal is associated with a measured temperature signal.

12. The method of claim 11 wherein the measured temperature signal corresponds to a temperature reading of a mechanism positioned within the power device.

13. The method of claim 11 further comprising testing the temperature sensor by comparing the measured temperature signal to a temperature threshold.

14. The method of claim 13 further comprising determining that the temperature sensor is operational in response to the measured temperature signal being greater than the temperature threshold.

15. The method of claim 13 further comprising determining that the temperature sensor is non-operational in response to the measured temperature signal being less than the temperature threshold.

16. The method of claim 10 wherein filtering the power signal to generate the filtered power signal further comprises filtering the power signal with the filter using a time constant $\alpha$, the time constant $\alpha$ corresponding to an amount of time that is needed for a predetermined temperature level to be achieved.

17. The method of claim 16 wherein the predetermined temperature level corresponds to 0.5° C.

18. An apparatus for testing a temperature sensor in a vehicle, the apparatus comprising:
   a battery charger including a filter and being configured to:
      receive a power signal from a charge station;
      generate a filtered power signal by filtering the power signal with the filter;
      compare the filtered power signal to a first threshold prior to testing the temperature sensor; and
      trigger testing the temperature sensor based in response to the filtered power signal being greater than the first threshold.

19. The apparatus of claim 18 wherein the filtered power signal is associated with a measured temperature signal.

20. The apparatus of claim 19 wherein the battery charger is further configured to test the temperature sensor by comparing the measured temperature signal to a temperature threshold.

* * * * *